United States Patent
Fries et al.

(10) Patent No.: US 6,425,125 B1
(45) Date of Patent: Jul. 23, 2002

(54) SYSTEM AND METHOD FOR UPGRADING CLIENT SOFTWARE

(75) Inventors: Robert M. Fries, Redmond, WA (US); Brian Wahlert, Homewood, IL (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/281,734

(22) Filed: Mar. 30, 1999

(51) Int. Cl.$^7$ .................................................. G06F 9/44
(52) U.S. Cl. ........................ 717/168; 717/169; 717/170
(58) Field of Search .......................... 717/11, 1, 5, 170, 717/174, 169; 710/1, 2; 703/21, 20; 711/2

(56) References Cited

U.S. PATENT DOCUMENTS

| | | | | |
|---|---|---|---|---|
| 5,287,499 A | * | 2/1994 | Nemes | 707/2 |
| 5,583,563 A | | 12/1996 | Wanderscheid et al. | 348/13 |
| 5,588,143 A | * | 12/1996 | Stupek et al. | 703/20 |
| 5,732,275 A | * | 3/1998 | Kullick et al. | 717/11 |
| 5,764,992 A | * | 6/1998 | Kullick et al. | 717/170 |
| 5,940,074 A | * | 8/1999 | Britt et al. | 345/749 |
| 5,960,189 A | * | 9/1999 | Stupek et al. | 703/21 |
| 5,974,428 A | * | 10/1999 | Gerard et al. | 345/764 |
| 6,031,830 A | * | 2/2000 | Cowan | 370/338 |
| 6,067,547 A | * | 5/2000 | Douceur | 707/100 |
| 6,154,878 A | * | 11/2000 | Saboff | 717/11 |
| 6,185,734 B1 | * | 2/2001 | Saboff et al. | 717/11 |
| 6,195,792 B1 | * | 2/2001 | Turnbull et al. | 717/110 |
| 6,199,203 B1 | * | 3/2001 | Saboff | 711/100 |
| 6,199,204 B1 | * | 3/2001 | Donohue | 717/11 |
| 6,202,207 B1 | * | 3/2001 | Donohue | 717/11 |
| 6,205,579 B1 | * | 3/2001 | Southgate | 707/203 |
| 6,216,175 B1 | * | 4/2001 | Sliger et al. | 710/1 |
| 6,243,766 B1 | * | 6/2001 | Sliger et al. | 710/2 |
| 6,256,773 B1 | * | 7/2001 | Bowman-Amuah | 717/1 |

* cited by examiner

Primary Examiner—Gregory Morse
Assistant Examiner—Chameli C. Das
(74) Attorney, Agent, or Firm—Lee & Hayes, PLLC

(57) ABSTRACT

A system for upgrading software has multiple clients coupled to an upgrade server. The clients store an old version of software. The upgrade server stores both the old version of software and a new version of software. The upgrade server creates an upgrade file from the old and new versions of the software such that the upgrade file is smaller than the new version. The upgrade server compares old character strings from the old version with new character strings from the new version to identify matching sections. The upgrade server derives a two-dimensional table containing multiple entries, whereby each entry represents a length of a longest common substring beginning at a first position in the old character string and at a second position in the new character string. The upgrade server then ascertains the longest common substring from the table. The upgrade server inserts headers into the upgrade file to distinguish between matching and non-matching sections. For matching sections, only the header is included and the section is omitted. The clients receive the upgrade file and begin processing the file to reconstruct the new version of software from the new sections included in the upgrade file and from the matching sections obtained locally from the stored old version of software.

42 Claims, 10 Drawing Sheets

|   | c | l | i | n | g |
|---|---|---|---|---|---|
| g |   |   |   |   | 1 |
| l |   |   |   |   | 0 |
| i |   |   |   |   | 0 |
| n |   |   |   |   | 0 |
| t |   |   |   |   | 0 |

*Fig. 5a*

|   | c | l | i | n | g |
|---|---|---|---|---|---|
| g |   |   | 0 | 0 | 1 |
| l |   |   | 0 | 0 | 0 |
| i |   |   | 2 | 0 | 0 |
| n |   |   | 0 | 1 | 0 |
| t |   |   | 0 | 0 | 0 |

*Fig. 5b*

|   | c | l | i | n | g |
|---|---|---|---|---|---|
| g | 0 | 0 | 0 | 0 | 1 |
| l | 0 | 3 | 0 | 0 | 0 |
| i | 0 | 0 | 2 | 0 | 0 |
| n | 0 | 0 | 0 | 1 | 0 |
| t | 0 | 0 | 0 | 0 | 0 |

*Fig. 5c*

SYSTEM AND METHOD FOR UPGRADING CLIENT SOFTWARE

TECHNICAL FIELD

This invention relates to distributed client-server systems and methods for upgrading client software from an upgrade server.

BACKGROUND

In traditional client-server systems, the server upgrades software on the client by transferring a new version of the program. The client is equipped with adequate memory resources to store both the old and new versions of the program. When the new version is present, the client informs the user that an upgrade is available and gives the user an opportunity to upgrade to the new version. If the user agrees, the old version is renamed out of the way and the new version is renamed to the default name used by the client when booting up or calling the program.

With the advent of alternative client products having limited processing capabilities and memory, this traditional model of upgrading software on the client cannot be used because the client is unable to store the entire new version of software. These scaled down or "thin" clients are typically constructed with just enough functionality to enable access to the server computer over a network. The thin client is typically able to store one version of the software, plus a little more. Examples of thin clients include low cost computers known as "network computers" or "NCs" and television set-top boxes (STBs).

This invention concerns a method for upgrading software on thin clients, although the method can be applied in other server-client contexts that employ general-purpose computing clients.

SUMMARY

This invention concerns a system for upgrading software in a client-server architecture. The system has multiple clients coupled to an upgrade server. The clients have limited processing and storage capabilities. Examples of such clients include network computers, set-top boxes, portable information devices, and so forth. The clients store an old version of software, such as in a flash memory.

The upgrade server has a processor and a memory. The upgrade server stores both the old version of software and a new version of software. The upgrade server runs an upgrade program that creates an upgrade file from the old and new versions of software such that the upgrade file is much smaller than the new version. In the compressed upgrade file, the upgrade server distinguishes between matching sections that match in both the old and new versions from non-matching sections that are present only in the new version with no counterpart in the old version.

The upgrade server identifies the matching sections by comparing an old character string (or any arbitrary string of bytes) from the old version with a new character string (or any arbitrary string of bytes) from the new version. The upgrade server finds common substrings in the two character strings. In one implementation, the upgrade server derives a two-dimensional table containing multiple entries, whereby each entry represents a length of a longest common substring beginning at a first position in the old character string and at a second position in the new character string. The upgrade server then ascertains the longest common substring from the table.

For matching sections, the upgrade server creates pointer headers that identify the sections in the old version that match sections in the new version. The upgrade server inserts the pointer headers into the upgrade file in lieu of the matching sections. For non-matching sections, the upgrade server creates data headers and inserts them and their corresponding non-matching sections from the new version into the upgrade file. The data headers indicate that the accompanying sections contain new data.

The upgrade server transfers the upgrade file, which is a compressed form of the new version of software. The client receives the upgrade file and begins processing the file to reconstruct the new version of software from the upgrade file and the old version stored locally. Upon reaching a data header, the client adds the new section from the new version. Upon reaching a pointer header, the client copies the common substring from the old version into the recreated new version. After the entire upgrade file is processed, the client possesses the new version of the software. The client can then inform the user, and upon reboot, begin operation using the new software version.

BRIEF DESCRIPTION OF THE DRAWINGS

FIGS. 5a–5c show a table constructed by the server to find longest common substrings in both the old and new versions of software. The table is shown at different levels of completion in the three figures.

DETAILED DESCRIPTION

This invention concerns a system for upgrading software in a client-server architecture. The invention is described generally in the context of thin clients, although aspects of this invention may be implemented in other client-server environments that do not use thin clients.

System Overview

Figure 1:
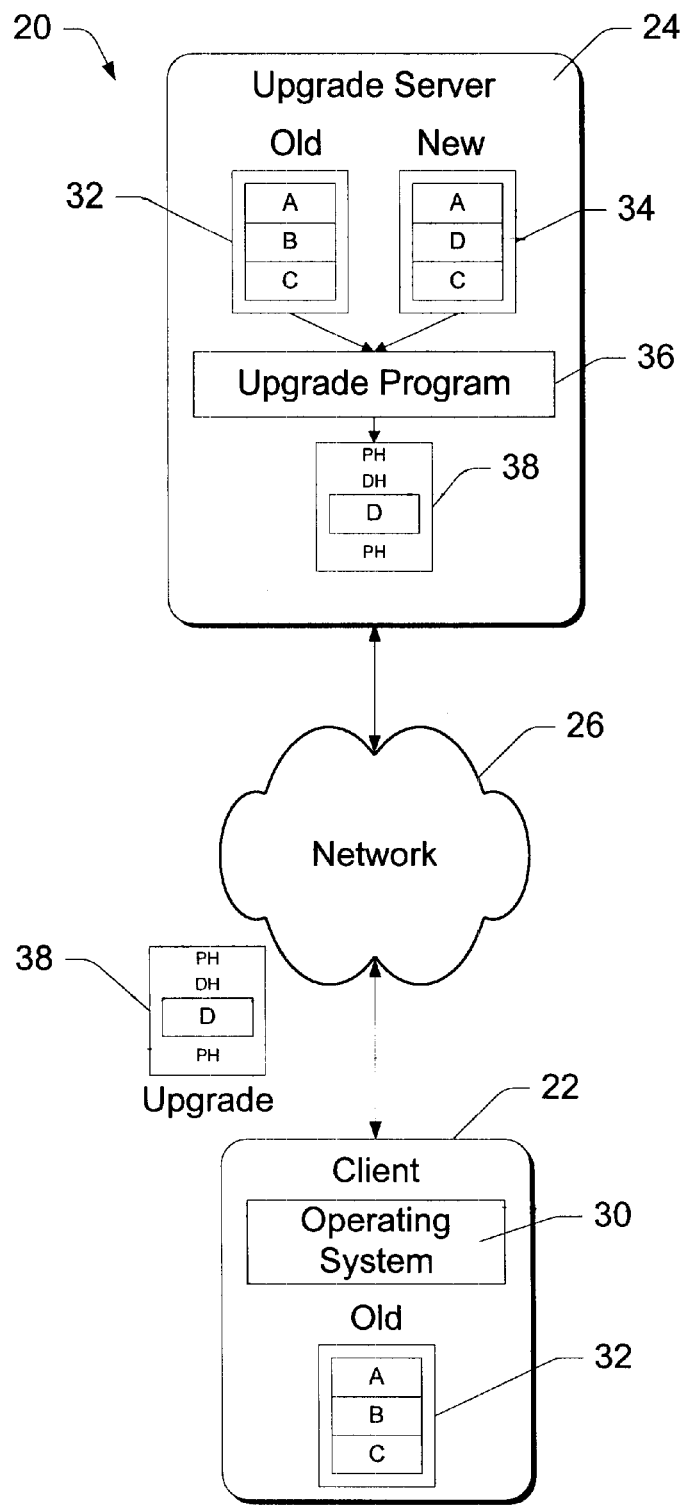
FIG. 1 illustrates a client-server system in which a server is configured to upgrade software on a client.

FIG. 1 shows a client-server system 20 having a client 22 connected to an upgrade server 24 via a network 26. The system 20 is representative of many different network systems, involving many diverse types of clients and a wide variety of networks including both wire-based and wireless technologies. For instance, the system 20 might be an Internet-based system in which the client and server are interconnected via the Internet, and the upgrade server transfers an upgrade file over the Internet to the client. The client 22 and server 24 connect to the Internet via conventional means, such as a modem, network connection, through an Internet Service Provider (ISP), and so forth. In this context, the client might be a computer, a thin client, a set-top box, or an information appliance.

As another example, the system 20 is representative of a television system in which the client and upgrade server are interconnected via a television distribution network, such as cable, RF, microwave, and satellite. In this context, the client 22 includes a set-top box and the upgrade server downloads an upgrade file to the set-top box via the TV distribution network.

As another example, the system 20 is representative of a system for programming portable devices in which the upgrade server transmits an upgrade file to a portable information device via a wire or wireless link. Examples of portable information devices include personal organizers, palm-size computers, cellular phones, programmable watches, pagers, and so forth. One particular example involving portable information devices is described in co-pending U.S. patent application Ser. No. 08/394,659, entitled "System and Method for Remotely Managing Memory in a Portable Information Device from an External Computer," which was filed Feb. 22, 1995. This application is assigned to Microsoft Corporation and is incorporated by reference.

The client 22 is preferably a thin client having enough processing and storage capabilities to store and run an operating system 30 and a program 32. Examples of programs stored on the client include a Web browser, an electronic programming guide, a personal scheduler, and so forth. The client 22 is typically not equipped with additional storage resources to store multiple programs or multiple copies of one program or a means for a user to load new software. As a result, the upgrade server periodically transfers new versions of the program in real-time to replace the old version of the program currently executing at the client.

The upgrade server 24 stores both the old version 32 of the program and a new version 34. The upgrade server runs an upgrade program 36 that creates an upgrade file 38 from the old and new versions. The upgrade file 38 is smaller than the new version 34, but can be used by the client to reconstruct the new version from the old version.

The upgrade program 36 treats the versions as images of raw data or strings of characters (i.e., numbers, letters, symbols, etc.), rather than lines of code. The upgrade program 36 compares the two images and distinguishes between sections that match in both versions from sections appearing only in the new version but having no counterpart in the old version.

In the upgrade file 38, the matching sections are replaced by "pointer headers" in lieu of the sections themselves. Each pointer header contains information to locate the associated section in the old version that is locally stored on the client. The client uses the pointer header to locate and copy the section when reconstructing the new version. Thus, the section need not be downloaded from the upgrade server. In FIG. 1, the matching sections A and C in the old and new versions 32 and 34 are replaced in the upgrade file 38 with pointer headers PH.

A second header, referred to as a "data header", demarcates each of the non-matching sections in the upgrade file. The non-matching sections are inserted following corresponding data headers. The data headers specify the size of the following data sections. In FIG. 1, the non-matching section D in the new version 34 is added to the update file beneath a corresponding data header DH.

The upgrade program 36 transfers the upgrade file 38 to the client 22. Since it is likely that only a small amount of the code has actually changed from the old version to the new version, large portions of the new version need not be downloaded. The pointer headers convey essentially the same information to the client. Accordingly, the upgrade file 38 is likely to be substantially smaller than the new version of the software, thereby enabling a more rapid real-time download of the file in comparison to downloading the entire new version.

The operating system 30 at the client 22 is capable of processing the upgrade file 38 to reconstruct the new version of the program. Upon reaching a data header, the client 22 adds the new section contained in the upgrade file 38 to the reconstructed program. Upon reaching a pointer header, the client 22 copies the matching section from the old version 32 into the reconstructed program. After the entire upgrade file is processed, the client has the new version of the program.

Exemplary Client

Figure 2:
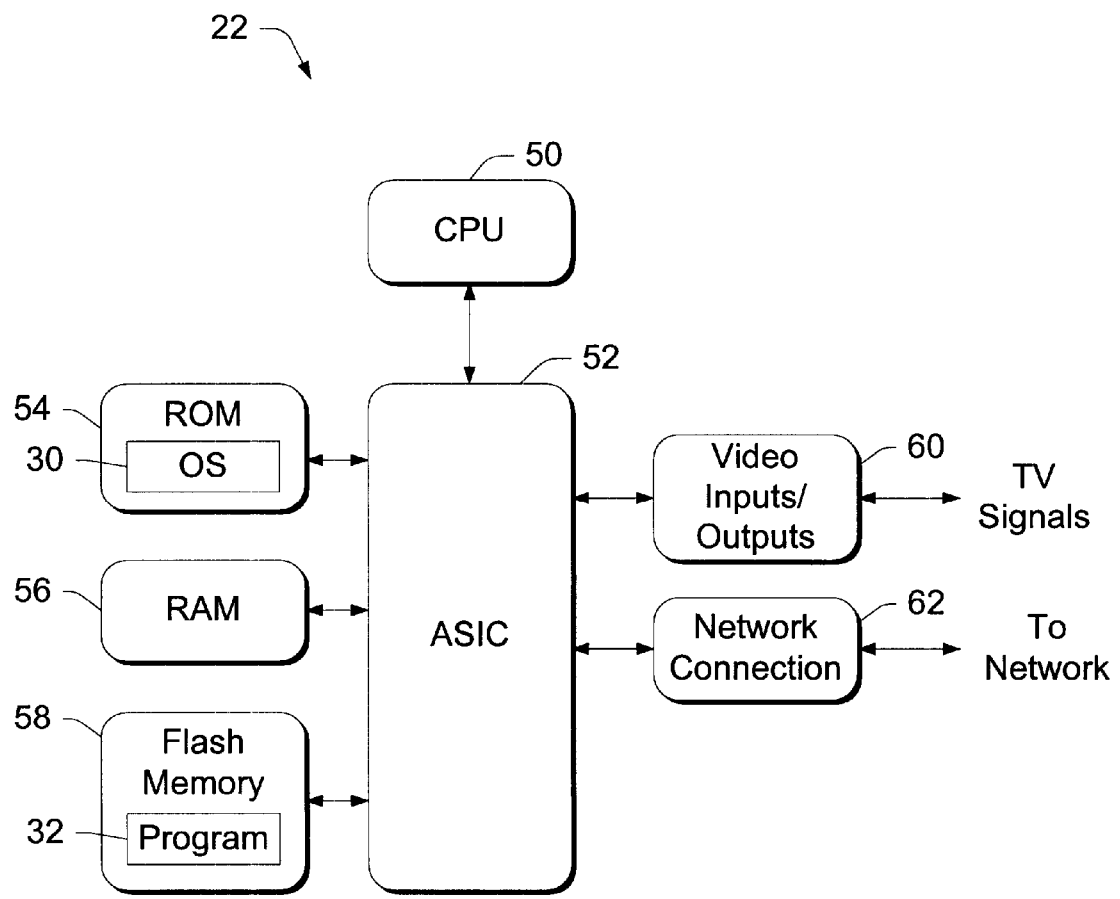
FIG. 2 is a block diagram of functional components in the client.

FIG. 2 shows the client 22 implemented as a set-top box according to one exemplary implementation of this invention. The client 22 has a central processing unit (CPU) 50 coupled to an application-specific integrated circuit (ASIC) 52. The ASIC 52 contains logic circuitry, bussing circuitry, and a video controller.

The client 22 has a Random Access Memory (RAM) 54, a Read Only Memory (ROM) 56, and a flash memory 58 coupled to the ASIC 52. RAM 54 temporarily stores the upgrade file 38 and the new program as it is being reconstructed. ROM 56 stores the operating system 30. The flash memory 58 stores the program 32 (i.e., browser software, electronic programming guide, etc.) that is periodically upgraded. The flash memory 58 initially stores the old version of the program, but following completion of the new version, replaces the old version with the reconstructed new version.

The client 22 has a video input 60 to receive television signals that are passed through the set-top box to the television set. The client also has a network connection 62 (e.g., modem) to provide connection to the network 26 and to communication to the upgrade server. Other components of a set-top box—an IR interface, a television decoder, an audio digital-to-analog converter, and the like—are not shown for simplicity purposes.

Exemplary Upgrade Server

Figure 3:
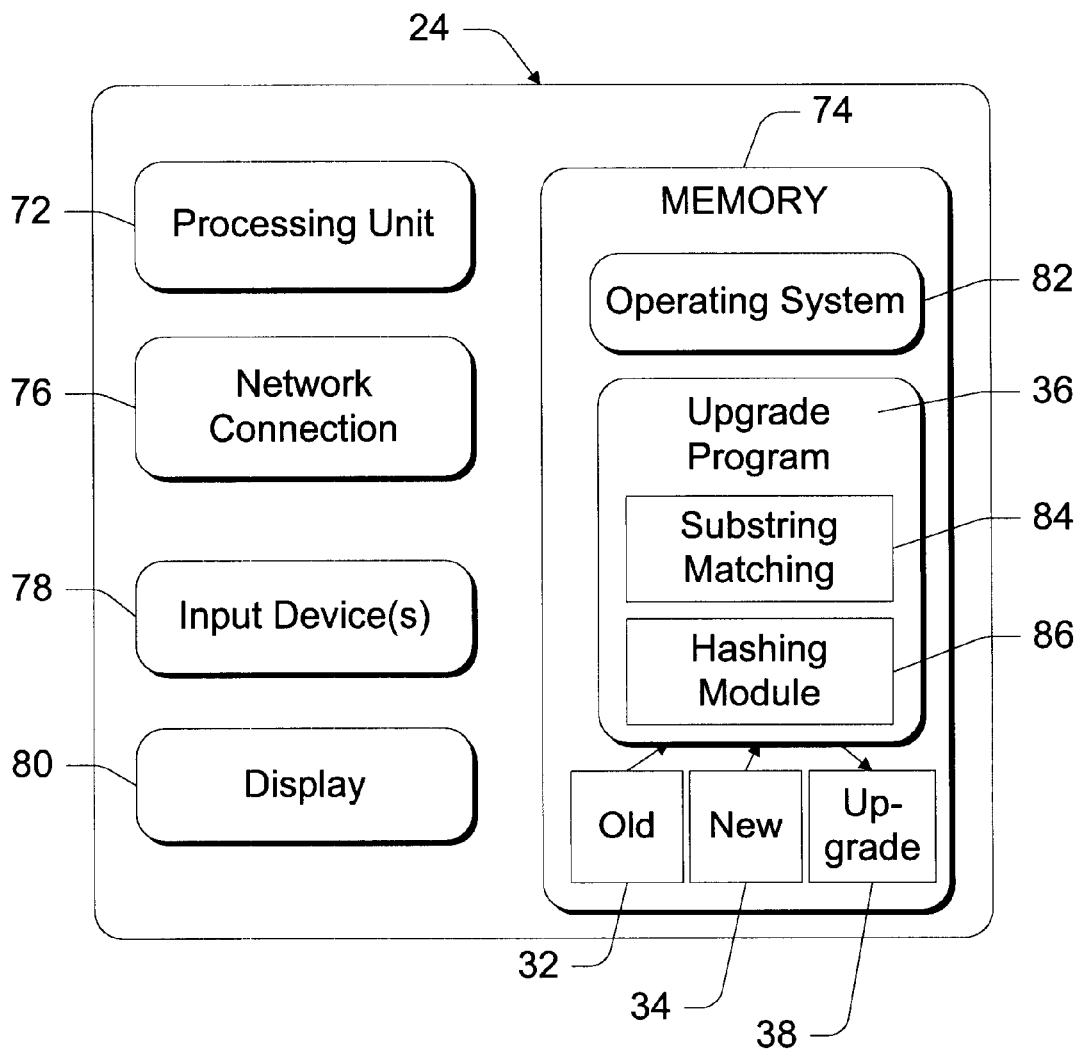
FIG. 3 is a block diagram of functional components in the server.

FIG. 3 shows an exemplary implementation of an upgrade server 24. It has a processing unit 72, memory 74 (e.g., RAM, ROM, flash, floppy disk, hard disk, CD-ROM, disk array, etc.), and a network connection 76 to provide access to the network 24. The server 24 may optionally be equipped with one or more input devices 78 (e.g., keyboard, mouse, track ball, touch panel screen, etc.) and a display 80.

The upgrade server runs an operating system 82 that is stored in memory 74 and executed on the processing unit 72. As an example, the operating system 82 may be the Windows NT operating system from Microsoft Corporation, or a Unix-based operating system.

The upgrade server 24 stores the old program version 32 and the new program version 34 in memory 74. The upgrade server runs an upgrade program 36, which is stored in memory 74 and executed on the processing unit 72, to create an upgrade file 38 from images of the old and new versions of the software. The upgrade program 36 has a substring matching module 84 that finds common character substrings in the two program versions to identify the matching sections in the two images. The substring matching module 84 identifies the common substrings regardless of their respective locations within the program versions. The upgrade program 36 may also have a hashing algorithm 86 that is capable of hashing one or both program versions and constructing a hash table, as a result. Use of the hashing algorithm is described below under the section heading "Modified Upgrade Process".

Upgrade Process

A method for upgrading software in the client remotely from the upgrade server involves two phases: (1) creating, at the upgrade server, an upgrade file from images of the old and new versions of the software, and (2) reconstructing, at the client, the new version of the software from the upgrade file.

Three different implementations of the upgrade process are described below. A general upgrade process is described first. The general case utilizes a basic compression technique that can be applied to any two data files that are expected to contain similarities. Following this discussion is a description of a modified upgrade process that involves use of a hashing table to improve the speed of the basic compression algorithm. The third case is more specifically directed to use of a specific data structure of image files, referred to as NK (new kernel) image files, and to improvements in the upgrade process tailored to these files. These cases are addressed below under separate headings.

Case 1: General Upgrade Process

The general upgrade process is described with reference to FIGS. 4–6. The upgrade file creation phase is described with respect to FIG. 4, while the reconstruction phase is addressed in FIG. 6.

Figure 4:
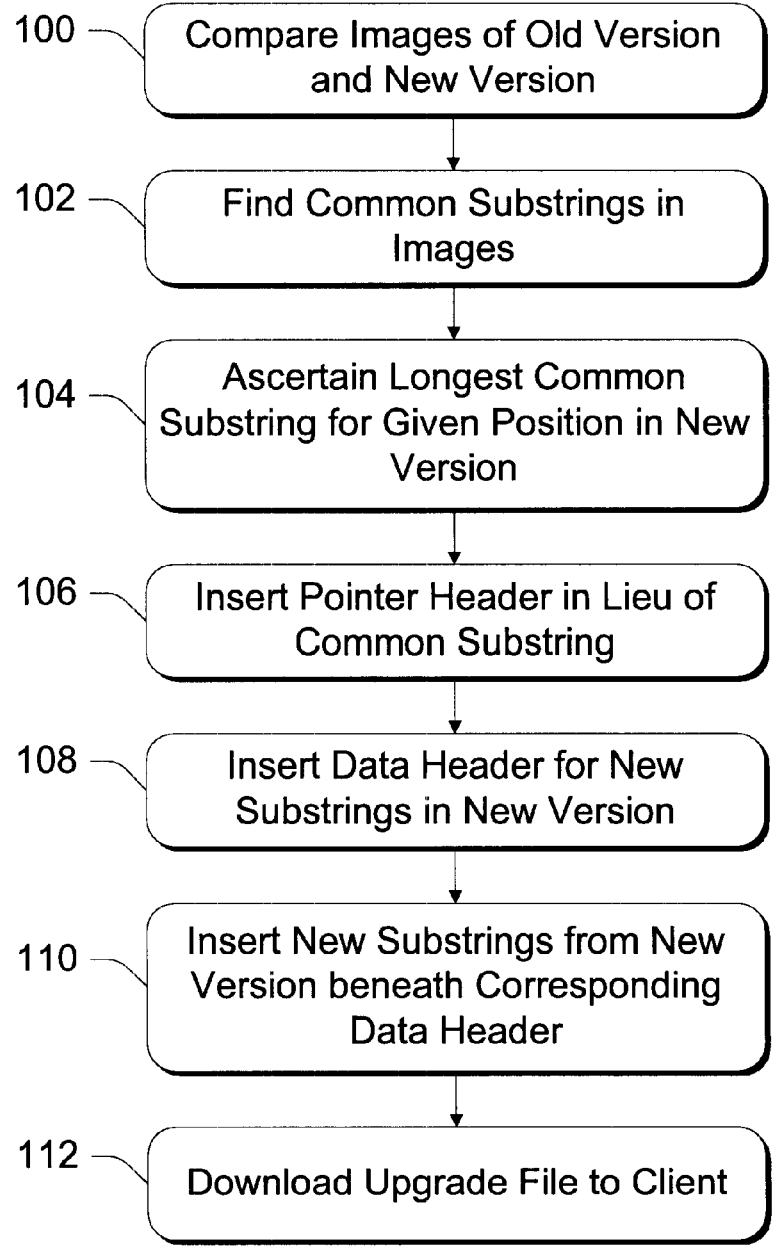
FIG. 4 is a flowchart showing steps in a method for creating an upgrade file from old and new versions of software.

FIG. 4 shows steps in a method for constructing an upgrade file to upgrade the old version of software to the new version of software. The steps are performed by computer-executable instructions contained in the upgrade program 36 at the upgrade server 24.

At step 100, the upgrade program 36 compares images of the old program version and the new program version. The upgrade program treats the images as raw data or character strings, and not as code. Accordingly, the old program version is seen as one large character string, and the new program version is seen as a different large character string.

At step 102, the substring matching module 84 finds all of the substrings that the old and new character strings have in common given different starting points in the two strings. More particularly, the substring matching module 84 derives the length of each longest common substring beginning at a first position in the old character string and at a second position in the new character string. The length can be any value from 0 to many characters.

More succinctly, the substring matching module 84 finds, for any two strings, s1 and s2, and two offsets into the strings, p1 and p2, the longest common substring starting at offset p1 in string s1 and offset p2 in string s2. The substring matching module 84 runs a process that works backwards in the two strings from their ends to their beginnings, computing longest substrings in terms of earlier computed longest substrings. The process is embodied in the following code:

for i=1 to length(s1)
   substr[i][length(s2)+1]=0;

for j=1 to length(s2)
   substr[length(s1)+1][j]=0;

for i=length(s1) down to 1 for j=length(s2) down to 1
     if s1[i]=s2[j]
       substr[i][j]=substr[i+1][j+1]+1;

else
       substr[i][j]=0;

The process constructs a two-dimensional table having multiple entries substr[i][j]. Each entry, substr[i][j], is the length of the longest common substring beginning at position "i" in string s1 and position "j" in string s2.

To demonstrate this process, suppose string s1 is a short character string "cling" and string s2 is a short character string "glint". Notice that these two character strings share the middle three letters "lin". The process begins at the last characters in the strings "cling" and "glint", and works back towards the beginning characters.

For the first pass, the position counters "i" and "j" are set to five. The term s1[i] references the "g" in "cling" and the term s2[j] references the "t" in glint". These characters do not match, and hence "j" is decremented to four, changing the term s2 [j] to reference the "n" in "glint". Again, there is no match. The process continues for j=3 (i.e., s2[3]=i), and then for j=2 (i.e., s2[2]=l). No match occurs until the position counter j is decremented to one, at which the term s2[1] references the "g" in "glint". At this point, the "g" in "glint (i.e., string s2) matches the "g" in "cling" (i.e., string s1). According to the above code, the substring variable substr[5][1] is given a value "substr[i+1][j+1]+1 ", which in this case is substr[6][2]+1, or one. Hence, a value of one is inserted into the table for the entry substr[5][1 ].

FIG. 5a shows a two-dimensional table 120 being indexed by the characters in string s1 (i.e., "cling") and the string s2 (i.e., "glint"). FIG. 5a shows the table 120 with the last column filled in. The value one at the intersection of the two "g"s in the character strings indicates that there is a substring one character in length that begins at position 5 in the string s1 (i.e., the "g" in "cling") and at position 1 in string s2 (i.e., the "g" in "glint").

The position counter "i" for string s1 is then decremented to four, and the process cycles again through the position counter "j" for string s2 from five to one. In this case, the "n" characters in each string match at j=4 and i=4. Accordingly, entry substr[4 ][4] is given a value "substr[4+1][4+1]+1", which in this case is substr[5][5]+1, or one.

When the position counter "i" is decremented to three, the "i" characters in each string match at j=3 and i=3. In this case, entry substr[3][3] is given a value "substr[3+1][3+1]+ 1", or two. The value two indicates that there is a substring two characters long that begins at position 3 in the string s1 (i.e., the "i" in "cling") and at position 3 in string s2 (i.e., "i" in "glint").

FIG. 5b shows the two-dimensional table 120 with the entries in the last three columns filled in.

The process continues for values i=2 and i=1. FIG. 5c shows the two-dimensional table 120 with all of the entries filled in. Notice that entry substr[2][2] has a value three, indicating that a common substring of three characters in length begins at position 2 in string s1 and position 2 in string s2.

At step 104, the substring matching module ascertains the longest common substring for a given position pos2 in the string s2 (i.e., the new software version). This step is performed as follows:

[maxRunLen pos2]={max substr[i][pos2]:1<i<length(s1)}

The byte count matched is maxRunLen[pos2] and the pointer into string s1 is the i such that substr[i][pos2] is maximized. Using the above example, the maximum substring beginning at position 3 in the second string "glint" is two. The maximum substring beginning at position 2 in the second string "glint" is three.

After the upgrade program has found common substrings, it can distinguish between matching sections of the program versions (i.e., substrings that are present in both versions of the software) and non-matching sections (i.e., substrings in the new version, but not in the old version). The upgrade program can begin building the upgrade file and demarcating the two different types of sections. That is, the upgrade program places a token or header at the beginning of each section to designate the type of section.

At step 106, for matching sections, the upgrade program 36 inserts corresponding pointer headers in the upgrade file in lieu of the common substrings. The pointer headers reference corresponding locations in the old version of the program at which the common substrings reside. These pointer headers convey essentially the same information about the new version as if the entire common substrings were reproduced in the upgrade file and hence, the common substrings are omitted from the upgrade file. However, since the pointer headers are smaller in size than the common substrings they represent (and often times, substantially smaller), the substitution of pointer headers for long common substrings helps compress the update file to a size smaller than the new version.

At step 108, for non-matching sections, the upgrade program inserts corresponding data headers into the upgrade file. The data headers indicate that the accompanying data are new sections and are not found in the old program version. The upgrade program also copies the new substrings into the upgrade file in association with their data headers (step 110).

The pointer and data headers contain four fields. The first field is a one-bit flag that identifies the header as either a pointer header or a data header. The second field is a two-bit count of the additional bytes necessary to represent the amount of data in the section. The third field contains a data length indicating the number of bytes in the corresponding section. The third field ranges from five to twenty-nine bits. The fourth field contains an offset value indicating the number of bytes into the old version to locate the start of a common substring. The fourth field is used only for the pointer header (24-bits), and is null in the data header. Table 1 summarizes the header types.

TABLE 1

| Token type | Type flag | Byte count | Data Length | File offset |
|---|---|---|---|---|
| Pointer | 1 bit | 2 bits | 5 to 29 bits | 24 bits |
| Data | 1 bit | 2 bits | 5 to 29 bits | none |

The byte count and data length fields allow efficient representation of both short and long runs. Most runs are short, so many of the bits in the data length field are not needed. For long runs, however, a large bit value can be stored in the length field. With the two-bit byte count, the length field can occupy five, 13, 21, or 29 bits, as necessary.

Accordingly, the header occupies one to four bytes for data sections and four to seven bytes for reference sections. The compressed upgrade file ends up comprising many sections, each of which is either an old section (which is replaced with a four-byte to seven-byte pointer into the old version) or a new section of raw data (which is demarcated by a one-byte to four-byte pointer).

Since the pointer header ranges from four to seven bytes, one optimization to the process described above is that it only finds common substrings that are greater than this pointer header length, such as eight bytes. These longer substrings are then replaced with pointer headers in the compressed update file. Common substrings that are less than eight bytes may be copied directly into the upgrade file in less space than would be consumed by a corresponding pointer header. This optimization precludes inclusion of pointer headers for short substrings on the order of only a few characters (e.g., eight bytes or less).

At step 112, the upgrade server 24 downloads the upgrade file 38 to the client 22 over the network 26. The client 22 in turn uses the upgrade file 38 to upgrade the old version of the program to the new version.

Figure 6:
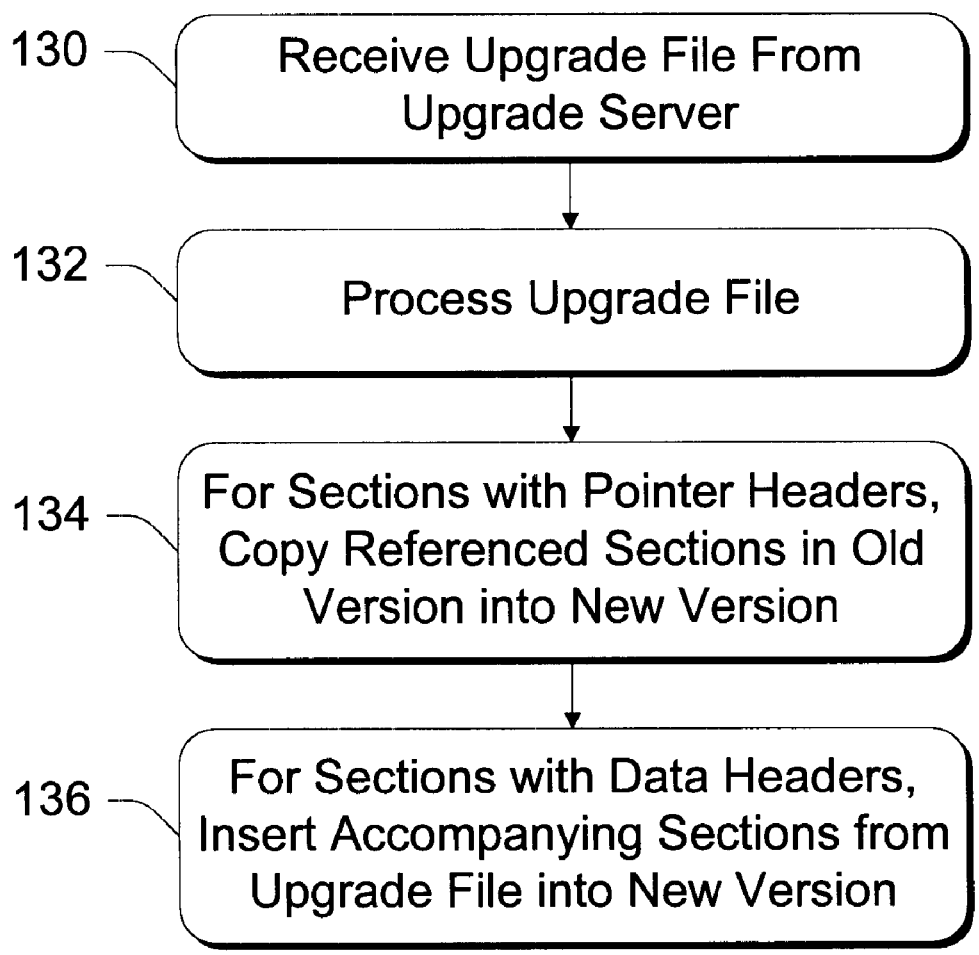
FIG. 6 is a flowchart showing steps in a method for reconstructing the new version of software from the old version and the upgrade file formed by the steps in FIG. 4.

FIG. 6 shows steps in a method for reconstructing the new software version from the upgrade file and old version. The steps are performed by computer-executable instructions stored in memory at the client. Alternatively, the steps might be performed by specific hardware components at the client that contain hardwired logic for performing the steps, or by any combination of programmed computer components and custom hardware components.

At step 130, the client receives the upgrade file 38 from the upgrade server 24 and stores the file in RAM 54. The client 22 processes the upgrade file 38 section by section, according to the headers it encounters (step 132). The client's operating system 30 is configured to perform the upgrade procedures to reconstruct the new version of the program from the old version and the upgrade file. The reconstructed new version is stored in the flash memory 58.

For any section in the upgrade file that is demarcated by a pointer header, the client copies the longest common substring referenced by the pointer header from the old version of the program stored in flash memory 58 into the new version being reconstructed (step 134). The file offset value in the pointer header locates the start of the common substring and the byte count informs the client of the length of the common substring. The client allocates sufficient space in the flash memory to hold a section as large as the byte count indicates, and then copies in the section.

For any section in the upgrade file that is demarcated by a data header, the client adds the new section included in the upgrade file into the new version being reconstructed (step 136). The client uses the data header's byte count to determine the size of the ensuing new section. The client allocates sufficient space to accommodate the new section and writes the new section into the reconstructed new version.

The client continues through the upgrade file, header by header and section by section. When the client has finished processing the upgrade file, the client informs the user of a new version of software and prompts the user as to whether he/she would like to upgrade to the new version. If so, the client reboots using the new version stored in flash memory.

Case 2: Modified Upgrade Process with Hash Table

The modified upgrade process improves the speed of the basic process for creating an upgrade file by using a hash table. A hash table is a data structure that allows efficient lookup of values in a large data set. A hash function maps the key values from a large range to a smaller range, which can be chosen arbitrarily.

Figure 7:
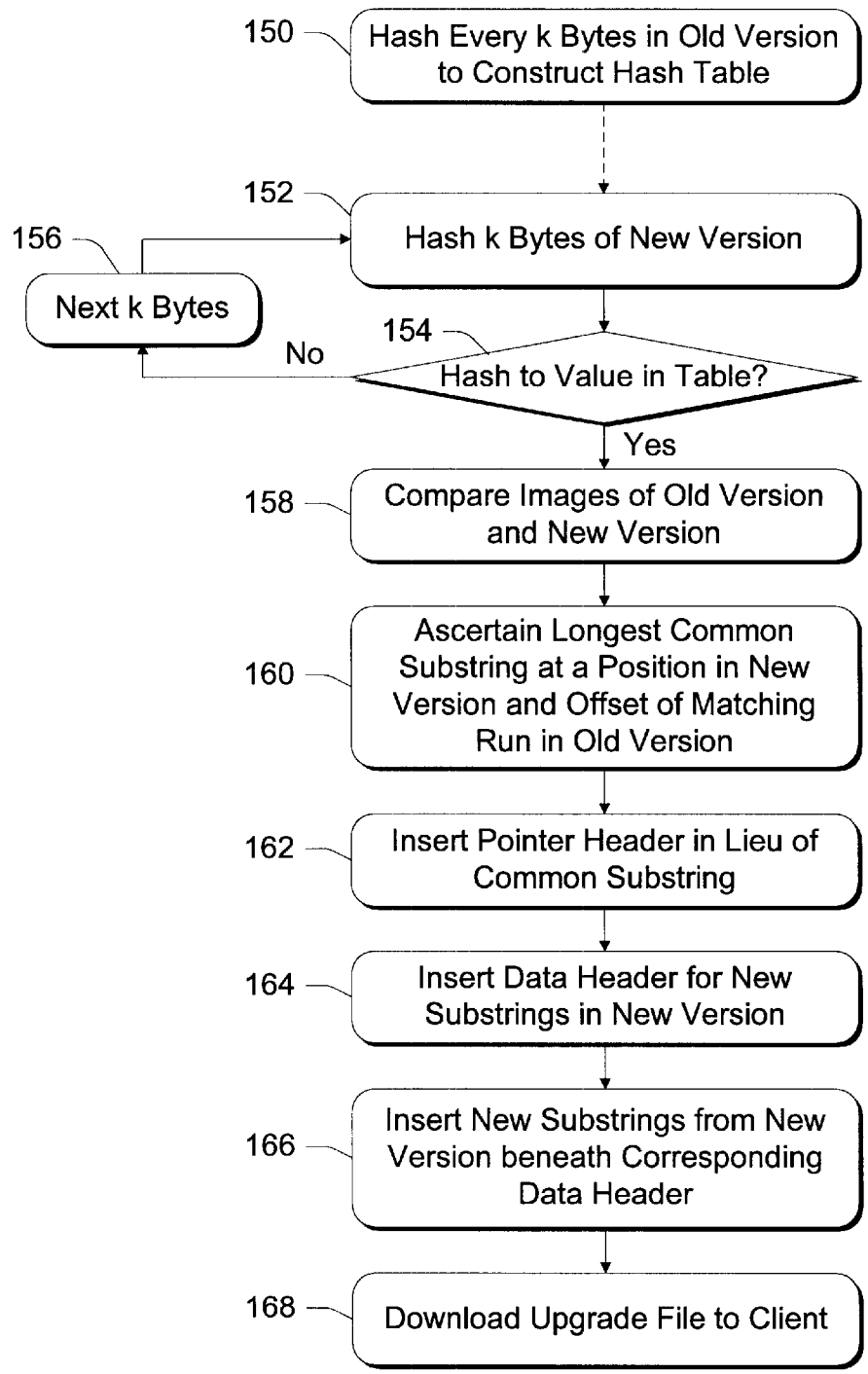
FIG. 7 is a flowchart showing steps in another method for creating an upgrade file from old and new versions of software by using a hashing table.

FIG. 7 shows steps in another method for constructing an upgrade file to upgrade using the modified process. The steps are performed by computer-executable instructions contained in the upgrade program 36 at the upgrade server 24.

A preliminary step 150 in the modified upgrade process involves hashing every possible group of k contiguous bytes in the old file version into a large hash table. The upgrade program 36 employs the hashing algorithm 86 to hash bytes 0 to k, then bytes 1 to k+1, and so on. After the hash table is constructed, the upgrade program 36 evaluates the new software version against the old software version. The upgrade program 36 employs the hashing algorithm 86 to hash every possible group of k contiguous bytes of the new software version (step 152). The upgrade program 36 determines whether the k-byte run of the new version hashes to a value in the hashing table (step 154). If not, the upgrade program 36 proceeds to the next k-byte run in the new version (step 156); otherwise, the upgrade program 36 compares the old and new versions that begin with the common k-byte run (step 158).

In this manner, only k-bytes runs of the new version that hash to the same value as a k-byte run of the old version are compared. With a carefully chosen hash function, table size, and value of k, the number of such words can be kept small. As one example, the value k can be set to the threshold number of bytes for replacement with a reference header. For instance, if the process is optimized to find common substrings that are greater than eight bytes, the value k should be set to eight bytes to minimize the number of runs that hash to the same value.

At step 160, the upgrade program 36 ascertains the longest common substring beginning at a position in the new version and an offset into the old version where the corresponding matching run begins. Another efficiency improvement stems from an observation that in the basic compression process, every row of the table depends only upon the previous row. Thus, if the maximal runs are calculated on the fly instead of in a separate pass, only the current row and previous row need to be in memory, rather than the entire table. The hashing module 86 implements the following code.

```
for i=1 to length(s1)
    insert <Hash(s1[i]), i> into hash table for j=length(s2) down to 1
    for each <c, i> in hash table such that c=Hash(s2[j])

if (s1[i]=s2[j])
            if (i=length(s1)) or (j=length(s2)) or (s1[i+1]≠s2[j+1])
                curRow[i]=1;
            else
                curRow[i]=prevRow[i+1]+1;
            if (curRow[i]>maxRunLen[j])
                maxRunLen[j]=curRow[i];
                maxRunOffset[j]=i;
    Swap(prevRow, curRow);
```

When this code terminates, maxRunLen[j] contains the length of the maximal run beginning at offset j in File2, and maxRunOffset[j] contains the offset of the matching run in File1.

For a good performing hash table (i.e., one with a properly selected hash function, table size, and value of k), the code executes in time proportional to the sum of the lengths of the two files. This is a significant improvement over the original code described above in Case 1, which runs in time proportional to the product of the two lengths. Thus, while the original algorithm would have taken days to run on files of a few megabytes, the improved algorithm handles such files in seconds.

Steps 162–168 are similar to steps 106–112 of FIG. 4.

Case 3: Upgrade Process for NK Image File

The upgrade processes defined in cases 1 and 2 are well suited for two files (i.e., the old and new versions) that share a lot of data in common. Another aspect of this invention, however, concerns use of image files that are at least partly compressed. One exemplary file type, known as NK (new kernel) image files, is designed for sending large amounts of data from a server to a client and then unpacking the data to the correct locations on the client. NK image files have a specific format, beginning with a fifteen-byte header, defined by the following structure:

```
struct __ROMIMAGE_HEADER {
    UCHAR Signature[7];
    ULONG PhysicalStartAddress;
    ULONG PhysicalSize;
};
```

The data sections follow this header. Each data section has its own header, defined by the following structure:

```
struct __ROMIMAGE_SECTION {
    ULONG Address;
    union {
        ULONG Size;
        ULONG EntryPoint;
    };
    ULONG CheckSum;
};
```

The "Size" field indicates the size of the section in bytes and the "Address" field indicates the destination location for those bytes on the client. After "Size" bytes, there is another ROMIMAGE_SECTION structure defining the next data section. The NK image file can contain an arbitrary number of data sections. At the conclusion of the data sections is a final ROMIMAGE_SECTION structure with an "Address" field of zero to indicate the end of the file.

Although the NK image file structure is rather simple, the various sections of the NK images cannot be directly used in the modified compression algorithm described above under the "Case 2" heading because each of these sections, or even subparts of each section, may already be compressed using an LZ compression algorithm. Because one of the byproducts of a good data compression algorithm is apparent randomness in the resulting data, two very similar files may in fact lose all similarity once they have been compressed.

As a concrete example, suppose the old image file contains the sentence "Mary had a little lamb", and the new image file contains "John had a little lamb". When creating an upgrade file, the upgrade program 36 replaces the new sentence with a data run of four bytes for "John" and a reference run for the remaining 18 bytes, which are identical in both image files. Because the data header occupies one byte, and the reference header occupies four bytes, the compressed version is only nine bytes long (i.e., one-byte data header, four-byte data run for John, and four-byte reference header). This is just over one-half as large as the original file.

Now suppose that the two sentences are LZ compressed. In general, there will be no similarity between the resulting sentences, despite a high degree of similarity in the originals. LZ compression may reduce the size of the sentence from 18 bytes to 12 bytes, for example, but the algorithm used to find common substrings will not be able to reduce that size any further (and may actually increase it by a byte if we account for the data header).

To resolve this conflict between the LZ compression algorithm and the process used in creation of a compressed upgrade file, the upgrade program parses through the old and new NK image files and decompresses each compressed section. Afterwards, each section can be processed using the methods described in FIG. 4 or FIG. 7.

Figure 8A:
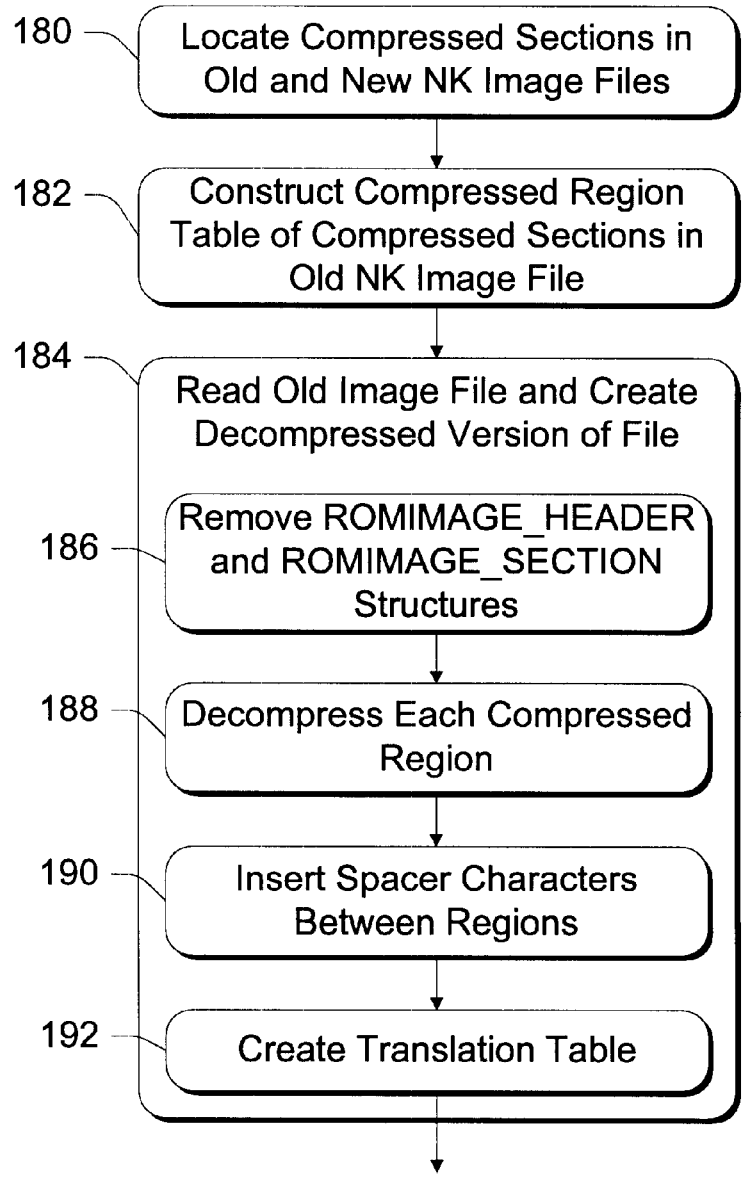
FIGS. 8a and 8b present a flowchart showing steps in a method for creating an upgrade file from old and new versions of software that are written in a specific file structure in which parts of the structure are compressed.
Figure 8B:
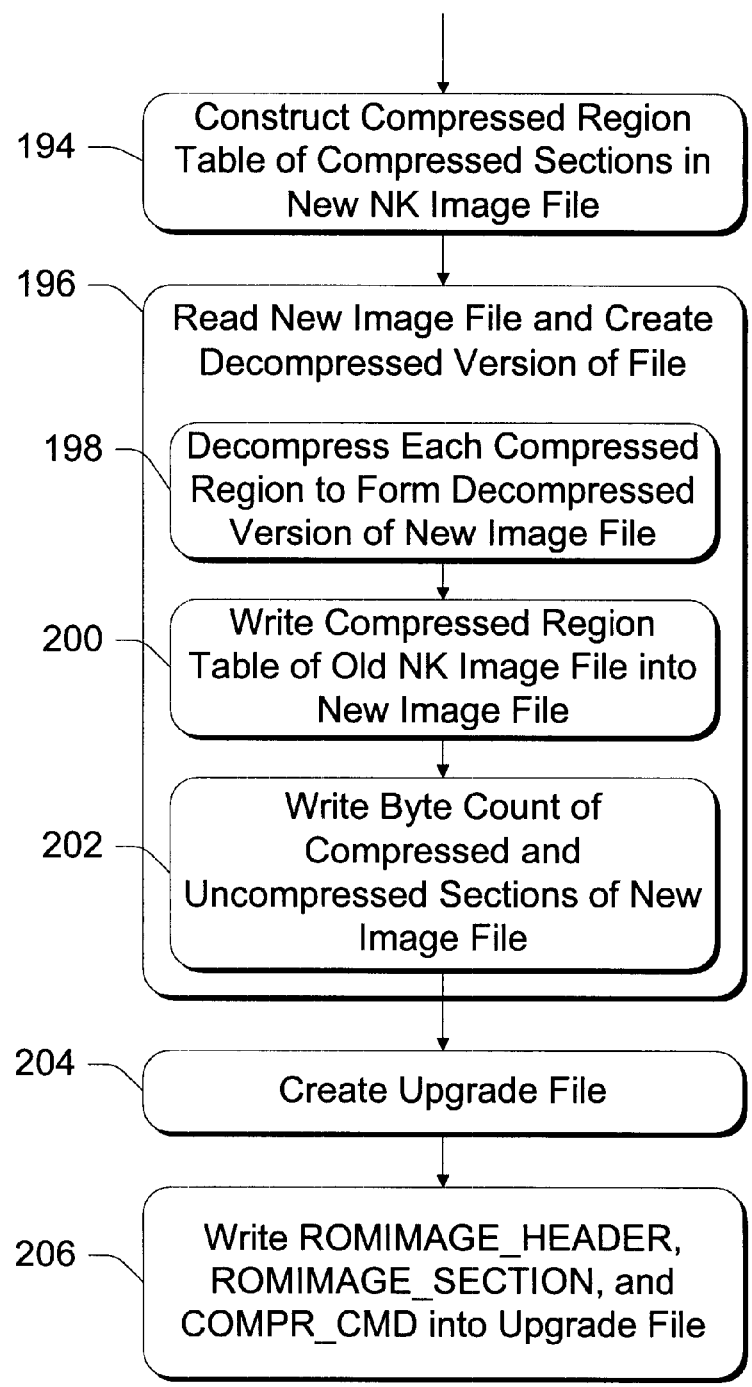

FIGS. 8a and 8b show steps in a method for constructing an upgrade file to upgrade an old NK image file to a new NK image file. At step 180, the upgrade program first locates the compressed sections in the two image files. Fortunately, each NK image file contains a table of contents that leads to this information. The table of contents has the following structure:

```
struct ROMHDR {
    ULONG    dllfirst;
    ULONG    dlllast;
    ULONG    physfirst;
    ULONG    physlast;
    ULONG    nummods;
    ULONG    ulRAMStart;
    ULONG    ulRAMFree;
    ULONG    ulRAMEnd;
    ULONG    ulCopyEntries;
    ULONG    ulCopyOffset;
    ULONG    ulProfileLen;
    ULONG    ulProfileOffset;
    ULONG    numfiles;
    ULONG    ulKernelFlags;
    ULONG    ulFSRamPercent;
    ULONG    ulDrivglobStart;
    ULONG    ulDrivglobLen;
    ULONG    ulIntrStackStart;
    ULONG    ulIntrStackLen;
    ULONG    ulTrackingStart;
    ULONG    ulTrackingLen;
};
```

The key entries are "nummods", which is the number of modules in the image, and "numfiles", which is the number of files. Immediately following the table of contents are TOCentry module entries, which have the following form:

```
struct TOCentry {
    DWORD     dwFileAttributes;
    FILETIME  ftTime;
    DWORD     nFileSize;
    LPSTR     lpszFileName;
    ULONG     ulE32Offset;
    ULONG     ulO32Offset;
    ULONG     ulLoadOffset;
};
```

Entry "ulE32Offset" is a pointer to an E32 structure, and entry "ulO32Offset" is a pointer to the first O32 structure for the module. The E32 structure has the following format:

```
struct e32_rom {
    unsigned short   e32_objcnt;
    unsigned short   e32_imageflags;
    unsigned long    e32_entryrva;
    unsigned long    e32_vbase;
    unsigned short   e32_subsysmajor;
    unsigned short   e32_subsysminor;
    unsigned long    e32_stackmax;
    unsigned long    e32_vsize;
    unsigned short   e32_subsys;
```

```
    struct info    e32_unit [ROM_EXTRA];
};
```

The "e32_object" entry contains the number of O32 structures for the module. The O32 structure has the following format:

```
struct o32_rom {
    unsigned long    o32_vsize;
    unsigned long    o32_rva;
    unsigned long    o32_psize;
    unsigned long    o32_dataptr;
    unsigned long    o32_realaddr;
    unsigned long    o32_flags;
};
```

Within this structure, the upgrade program can check whether the section is compressed by looking at "o32_flags". If (o32_flags & 0x00002000=1), the section is compressed. Entry "o32_psize" is the compressed size and entry "o32_vsize" is the uncompressed size. Entry "o32_dataptr" is a pointer to the section's data.

After the TOCentry structures for the modules are FILESentry structures for the files. These structures have the following form:

```
struct FILESentry {
    DWORD     dwFileAttributes;
    FILETIME  ftTime;
    DWORD     nRealFileSize;
    DWORD     nCompFileSize;
    LPSTR     lpszFileName;
    ULONG     ulLoadOffset;
};
```

If (dwFileAttributes & 0x00000800=1), the file is compressed. Entry "nCompFileSize" is the compressed file size and entry "nRealFileSize" is the real file size. Entry "ulLoadOffset" is a pointer to the file's data. Thus, by reading through the structures described above, the upgrade program can determine which sections in the old and new NK images are compressed.

At step 182 in FIG. 8, the upgrade program 36 reads through the old NK image file and constructs a table of the compressed regions in the file. Each table entry has the following form:

```
struct __COMPR_RGN
{
    UINT32 iAddress;
    UINT32 cBytesCompressed;
    UINT32 cBytesUncompressed;
};
```

Next, at step 184, the upgrade program 36 reads through the entire old image and creates a decompressed version of the old image file. During this read-through, the upgrade program 36 performs a number of tasks, including removal of the ROMIMAGE_HEADER and ROMIMAGE_SECTION structures (step 186), decompression of each compressed region (step 188), and insertion of spacer characters between the various regions (step 190). The spacers help avoid creation of reference runs that cross region boundaries. The upgrade program also creates a translation table (step 192), in which each entry has the following form:

```
struct __TranslationEntry
{
  UINT32 ipacked;
  ADDRESS iUnpacked;
};
```

Entry "iPacked" is the offset into the version of the old image file that is created, with the headers removed and all sections decompressed. Entry "iUnpacked" is the corresponding client destination address. The ADDRESS structure is defined as follows:

```
struct __ADDRESS
{
  UINT32 iAddr;
  UINT32 iOffset;
};
```

For an uncompressed region, entry "iOffset" in the ADDRESS structure is 0xffffffff, and entry "iAddr" is the actual client address. For a compressed region, however, entry "iAddr" is an index into the table of compressed regions formed in step 182 and entry "iOffset" is the offset into the decompressed version of that region.

As an example, suppose that the data from 0x9f420000 to 0x9f421000 is compressed, with decompressed size 2000, and the data from 0x9f421000 to 0x9f422000 is uncompressed. Byte 1500 in the decompressed region is referenced with "iAddr" zero, indicating the first compressed region in the table, and "iOffset" 1500. Address 0x9f422800 is referred to as "iAddr" 0x9f422800 and "iOffset" 0xffffffff.

At step 194 in FIG. 8, the upgrade program 36 reads through the new NK image file and constructs a table of the compressed regions in the file. Then, at step 196, the upgrade program 36 reads through the entire new image file a second time and creates a decompressed version of the new image. The upgrade program decompresses every compressed part of the entire image file (step 198), while leaving enough information to recompress the file back to its original state. This recompression information is in the form of compression commands that describe which sections should be compressed to yield the original image.

At step 200, the upgrade program writes the compressed region table of the old image at the beginning of the decompressed version of the new image file. In addition, the upgrade program writes the number of bytes in the compressed and uncompressed versions of the sections (step 202). As a result, the decompressed version of the new image is the same as the original version, with the following exceptions:

1. No compressed data remain.
2. The compressed region table for the old image is written at the beginning of the decompressed version of the new image file.
3. After each ROMIMAGE_SECTION structure, the uncompressed size of the section, which is equal to or greater than the Size field of the ROMIMAGE_SECTION structure, is written.
4. If the uncompressed size is greater than the size in the ROMIMAGE_SECTION structure, some part of the section must have been compressed. Thus, the process writes a number, the count of compression commands, and then a series of compression commands. Each of these has the following structure:

```
struct __COMPR_CMD
{
  UINT32 cBytesCompressed;
  UINT32 cBytesUncompressed;
};
```

The upgrade program 36 writes the number of bytes in the compressed version of the section and the number of bytes in the uncompressed version into the "COMPR_CMD" structure. If the two byte counts are equal, the section is not compressed. If they differ, the section will require LZ compression on the client side.

Now, it should be clear that given the correct LZ compression program, the original image file can be recreated from the new file.

At this point, the upgrade program 36 processes the decompressed versions of the old image file and the new image file to create an upgrade file (step 204 in FIG. 8*b*). The upgrade program uses the modified upgrade process described above in "Case 2" and a hash table containing decompressed version of the old image file. Essentially all data is compressed using the data and reference runs, as described above, with one exception. The program writes the ROMIMAGE_HEADER, ROMIMAGE_SECTION, and COMPR_CMD data directly into the upgrade file without trying to compress them as these data almost certainly will not be found in the old image (step 206).

One modification is made to the pointer token type to distinguish between copies from compressed and uncompressed regions. Table 2 shows the fields in the new tokens as follows:

TABLE 2

| Token type | Type | Compr | Byte count | Data length | Region | Offset |
|---|---|---|---|---|---|---|
| Pointer to compressed | 1 bit | 1 bit | 2 bits | 4 to 28 bits | 8 to 24 bits | 24 bits |
| Pointer to uncompressed | 1 bit | 1 bit | 2 bits | 4 to 28 bits | none | 24 bits |
| Data | 1 bit | none | 2 bits | 5 to 29 bits | none | none |

The new fields are "Compr," which is a flag indicating whether the region is compressed, and "Region," which is a pointer into the compressed region table. If the number of compressed regions is less than 256, one byte is used; if the number of compressed regions is less than 65536; two bytes are used; otherwise, three bytes are used.

Because the tokens can potentially be longer, the parameters for determining when to replace runs can be adjusted. For instance, the program may only replace runs of at least ten bytes with pointers. This is an adjustable heuristic, which has no affect on decompression.

The structure of the compressed version of the new image file is as follows:

1. One byte indicating whether the new image is compressed. If this byte is zero, the image is uncompressed. If the byte is non-zero, the image is compressed.
2. The table of the compressed regions in the old image. Three bytes indicate the size of the table, and then a series of COMPR_RGN structures from the table itself.
3. The ROMIMAGE_HEADER.
4. The following components are repeated for each section:
   a. A ROMIMAGE_SECTION structure
   b. The uncompressed size of the section.
   c. If the uncompressed size is not 0xffffffff, the data are compressed by the process. Otherwise, the actual section data remain. Some sections may grow as a result of the algorithm because the sections are first LZ decompressed before running our process. For some sections, the LZ compression may be better than our compression, so we leave those sections LZ compressed.

d. If the uncompressed size is greater than the Size in the ROMIMAGE_SECTION structure, the number of compression commands and the commands themselves.

5. Finally, a ROMIMAGE_SECTION structure with the Address set to zero.

This takes care of the server side phase. In the client-side reconstruction phase, the client can optionally read the compressed file in its entirety and then decompress it, or decompress section by section.

Figure 9:
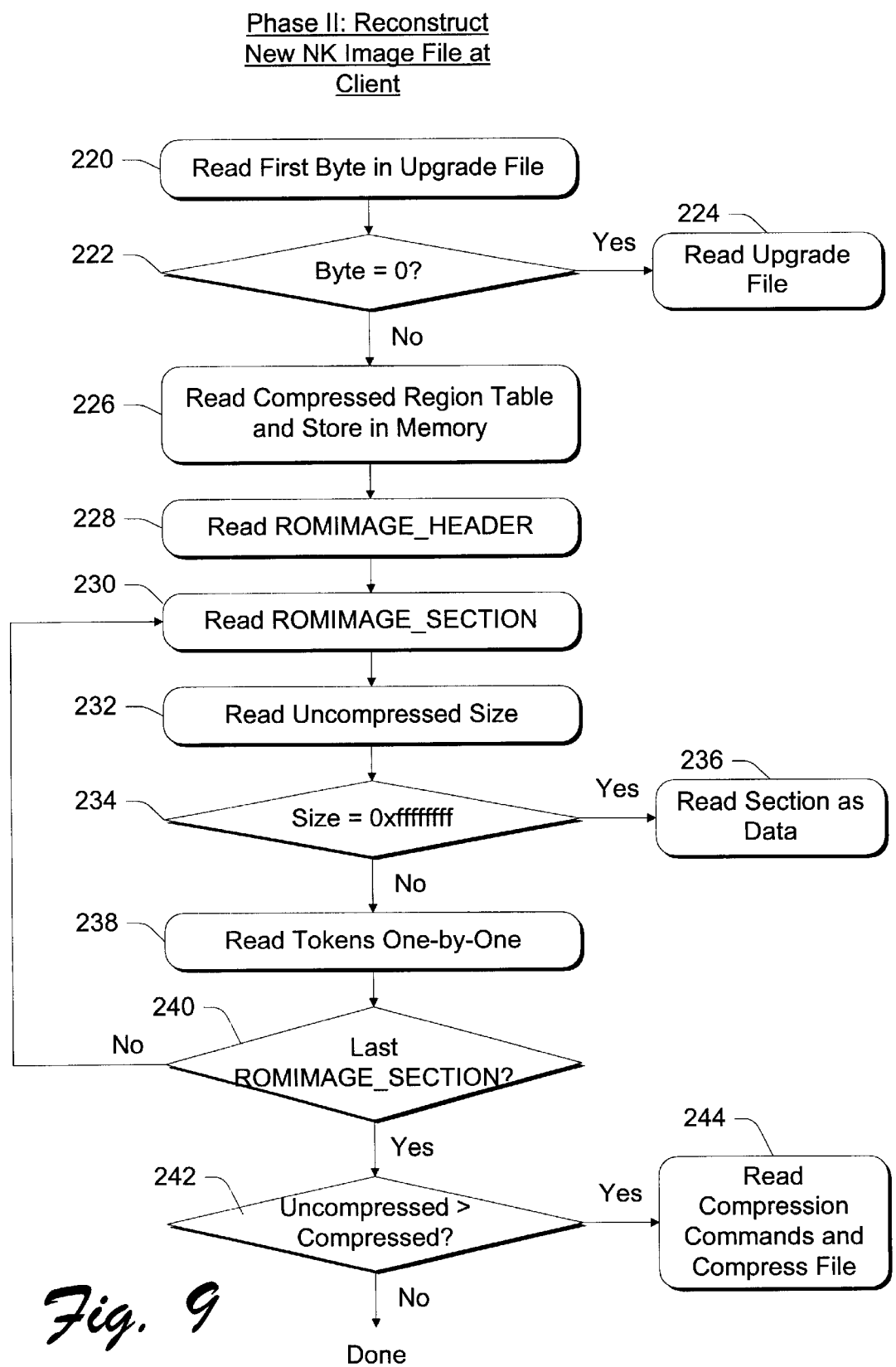
FIG. 9 is a flowchart showing steps in a method for reconstructing the new version of specific file structure from the old version and the upgrade file formed by the steps in FIGS. 8a and 8b.

FIG. 9 shows steps in a method for reconstructing the new software version from the upgrade file at the client. The steps are performed by computer-executable instructions stored in memory at the client. Alternatively, the steps might be performed by specific hardware components at the client that contain hardwired logic for performing the steps, or by any combination of programmed computer components and custom hardware components.

At step 220, the client reads the first byte to determine whether the file is compressed. If it is zero (i.e., the "yes" branch from step 222), the image is uncompressed and the client simply reads the rest of the file and treats it as a normal NK image (step 224). If the first byte is non-zero (i.e., the "no" branch from step 222), the image is compressed and the client continues through the following steps.

At step 226, the client reads the table of compressed regions and stores it in memory. The table is used later to handle the reference runs. The client reads the ROMIMAGE_HEADER (step 228). Then, at step 230, the client reads in the ROMIMAGE_SECTION structures one-by-one until reaching a last structure that has an Address field of zero. For each section, the client reads the uncompressed size (step 232). If the uncompressed size is 0xffffffff (i.e., the "yes" branch from step 234), the client reads in the entire section as data (step 236). Otherwise (i.e., the "no" branch from step 234), the client reads tokens one-by-one and copies the data from the compressed file for data tokens or from the old image file for copy tokens (step 238). The process stops when the uncompressed data size is reached.

The client evaluates the uncompressed image after reading through all ROMIMAGE_SECTION structures (i.e., the "yes" branch from step 240). At step 242, the client determines if the uncompressed size is larger than the compressed size. If so, the client reads in the compression commands and LZ compresses the new image to re-create the correct image file (step 244).

The above procedure can be run as described assuming the client has sufficient memory to hold the entire uncompressed old image file and the largest uncompressed section of the new image file. With less memory, the client can LZ decompress regions of the old image file on demand when they are needed. As a bare minimum, the client requires enough memory to hold the largest uncompressed section of the new image file and the largest uncompressed section of the old image file. As more memory is available, more of the old image file can be stored in its uncompressed state, and fewer times are needed to run the LZ decompression algorithm.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for constructing an upgrade file to upgrade from an old version of software to a new version of software, comprising the following steps:

distinguishing between matching sections that match in both the old version and the new version from non-matching sections in the new version that have no match in the old version;

for matching sections, inserting in the upgrade file a first token identifying a corresponding section in the old version that matches a section in the new version; and for non-matching sections, inserting in the upgrade file a second token and the non-matching section from the new version.

2. A method as recited in claim 1, wherein the first token comprises a header with at least one field indicating a number of bytes contained in the corresponding section in the old version.

3. A method as recited in claim 1, wherein the first token comprises a header with at least one first field indicating a number of bytes contained in the corresponding section in the old version and at least one second field holding an offset value into the old version to locate the corresponding section.

4. A method as recited in claim 1, wherein the second token comprises a header with at least one field indicating a number of bytes contained in the non-matching section in the new version.

5. A method as recited in claim 1, wherein:

the first token comprises a byte count indicating a number of bytes needed to represent an amount of data in the corresponding section, a data length indicating a number of bytes in the corresponding section, and an offset value into the old version to locate the corresponding section; and the second token comprises a header with the byte count and the data length.

6. A method as recited in claim 1, further comprising the step of identifying the matching sections by performing the following steps:

comparing an old character string from the old version with a new character string from the new version;

finding longest common substrings beginning at first positions in the old character string and second positions in the new character string; and for a particular second position in the new character string, ascertaining the longest common substring beginning at the particular second position.

7. A method as recited in claim 6, wherein the finding step comprises the step of constructing a two-dimensional table having multiple entries cross-indexed by the old and new character strings, individual entries representing a length of a longest common substring.

8. A method as recited in claim 1, further comprising the step of identifying the matching sections by performing the following steps:

hashing every possible group of k contiguous bytes in the old version to form first hash values;

hashing every possible group of k contiguous bytes in the new version to form second hash values; and in an event that one of the first hash values equals one of the second hash values, comparing an old character string from the old version that includes the k contiguous bytes forming said one first hash value with a new character string from the new version that includes the k contiguous bytes forming said one second hash value.

9. A method as recited in claim 8, further comprising the following steps:

finding longest common substrings beginning at first positions in the old character string and second positions in the new character string; and for a particular second position in the new character string, ascertaining the longest common substring beginning at the particular second position.

10. A method as recited in claim 9, wherein the finding step comprises the step of constructing a two-dimensional table having multiple entries cross-indexed by the old and new character strings, individual entries representing a length of a longest common substring.

11. A method as recited in claim 1, wherein the old version and the new version are at least partly compressed, further comprising the step of identifying the matching sections by performing the following steps:

decompressing the old version to form a decompressed old version;

decompressing the new version to form a decompressed new version;

comparing an old character string from the decompressed old version with a new character string from the decompressed new version;

finding longest common substrings beginning at first positions in the old character string and second positions in the new character string; and for a particular second position in the new character string, ascertaining the longest common substring beginning at the particular second position.

12. A method as recited in claim 11, wherein the decompressing steps each comprise the following steps:

evaluating the old or new version section by section;

identifying compressed sections; and decompressing the compressed sections.

13. A method as recited in claim 12, further comprising the step of inserting spacers between the sections.

14. A method as recited in claim 12, further comprising the step of writing into the upgrade file commands enabling recompression of the compressed sections at the client.

15. A method as recited in claim 1, wherein the old version and the new version are at least partly compressed, further comprising the step of identifying the matching sections by performing the following steps:

decompressing the old version to form a decompressed old version;

decompressing the new version to form a decompressed new version;

hashing every possible group of k contiguous bytes in the decompressed old version to form first hash values;

hashing every possible group of k contiguous bytes in the decompressed new version to form second hash values; and in an event that one of the first hash values equals one of the second hash values, comparing an old character string from the decompressed old version that includes the k contiguous bytes forming said one first hash value with a new character string from the decompressed new version that includes the k contiguous bytes forming said one second hash value.

16. A method as recited in claim 15, wherein the decompressing steps each comprise the following steps:

evaluating the old or new version section by section;

identifying compressed sections; and decompressing the compressed sections.

17. A method as recited in claim 16, further comprising the step of inserting spacers between the sections.

18. A method as recited in claim 16, further comprising the step of writing into the upgrade file commands enabling recompression of the compressed sections at the client.

19. A method as recited in claim 1, further comprising the step of using the upgrade file to upgrade the old version to the new version.

20. A computer-readable medium having computer-executable instructions for performing the steps as recited in claim 1.

21. A method for constructing an upgrade file to upgrade from an old version of software to a new version of software, comprising the following steps:

comparing an old character string from the old version with a new character string from the new version;

finding longest common substrings beginning at first positions in the old character string and second positions in the new character string;

for a particular second position in the new character string, ascertaining the longest common substring beginning at the particular second position;

inserting, in the upgrade file, a pointer header representing the longest common substring in lieu of inserting the longest common substring, the pointer header indicating a corresponding position in the old character string at which the longest common substring begins;

inserting, in the upgrade file, characters from the new character string that are not included in the longest common substring; and placing a data header indicating that the characters being inserted are not matched in the old character string.

22. A method as recited in claim 21, wherein the finding step comprises the step of constructing a two-dimensional table having multiple entries cross-indexed by the old and new character strings, individual entries representing a length of a longest common substring beginning at a first position in the old character string and a second position in the new character string.

23. A method as recited in claim 21, wherein the pointer header includes a byte count indicating a number of bytes contained in the longest common substring.

24. A method as recited in claim 21, wherein the pointer header includes a byte count indicating a number of bytes contained in the longest common substring and an offset value identifying a corresponding first position in the old character string at which the longest common substring begins.

25. A method as recited in claim 21, wherein the data header includes a byte count indicating a number of bytes of the characters being inserted.

26. A method as recited in claim 21, further comprising the step of using the upgrade file to upgrade the old version to the new version.

27. A method for constructing an upgrade file to upgrade from an old version of software to a new version of software, comprising the following steps:

hashing every possible group of k contiguous bytes in the old version to form first hash values;

hashing every possible group of k contiguous bytes in the new version to form second hash values;

in an event that one of the first hash values equals one of the second hash values, comparing an old character string from the old version that includes the k contiguous bytes forming said one first hash value with a new character string from the new version that includes the k contiguous bytes forming said one second hash value;

finding longest common substrings beginning at first positions in the old character string and second positions in the new character string; and for a particular second position in the new character string, ascertaining the longest common substring beginning at the particular second position.

28. A method as recited in claim 27, further comprising the following steps:

inserting, in the upgrade file, a pointer header representing the longest common substring in lieu of inserting the longest common substring, the pointer header indicating a corresponding position in the old character string at which the longest common substring begins;

inserting, in the upgrade file, characters from the new character string that are not included in the longest common substring; and placing a data header indicating that the characters being inserted are not matched in the old character string.

29. A method as recited in claim 27, wherein the old version and the new version are at least partly compressed, further comprising the step of decompressing the old and new versions prior to the hashing steps.

30. A method for upgrading software in a client remotely from an upgrade server, comprising the following steps:

at the upgrade server, performing the following steps:
comparing an old character string from an old version of software with a new character string from a new version of software;
finding longest common substrings beginning at a first position in the old character string and a second position in the new character string;
for a particular second position in the new character string, ascertaining the longest common substring beginning at the particular second position;
inserting, in an upgrade file, a pointer header representing the longest common substring in lieu of inserting the longest common substring, the pointer header indicating a corresponding position in the old character string at which the longest common substring begins;
inserting, in the upgrade file, characters from the new character string that are not included in the longest common substring;
placing a data header indicating that the characters being inserted are not matched in the old character string; and
transferring the upgrade file to the client;

at the client, performing the following steps:
receiving the upgrade file from the upgrade server;
processing the upgrade server to reconstruct the new version of software;
for any section in the upgrade file demarcated by the data header, adding the new characters to the reconstructed new version; and
for any section in the upgrade file demarcated by the pointer header, copying the longest common substring from the old version into the reconstructed new version.

31. A method as recited in claim 30, wherein the finding step comprises the step of constructing a two-dimensional table having multiple entries cross-indexed by the old and new character strings, each entry representing the longest common substring beginning at the first position in the old character string and at the second position in the new character string.

32. A method as recited in claim 30, wherein the pointer header includes a byte count indicating a number of bytes contained in the longest common substring.

33. A method as recited in claim 30, wherein the pointer header includes a byte count indicating a number of bytes contained in the longest common substring and an offset value identifying a corresponding first position in the old character string at which the longest common substring begins.

34. A method as recited in claim 30, wherein the data header includes a byte count indicating a number of bytes of the characters being inserted.

35. A software upgrading system, comprising:

a client having a processor and a memory, the memory storing an old version of software;

an upgrade server having a processor and a memory, the upgrade server memory storing both the old version of software and a new version of software, the upgrade server identifying a longest common substring that is common to both the old version and the new version and creating an upgrade file with a pointer header representing the longest common substring in lieu of the longest common substring, the pointer header indicating a corresponding position in the old version at which the longest common substring begins, and the upgrade file further containing at least one section from the new version that is not included in the longest common substring and a data header indicating that the section is new; and the client processing the upgrade file to reconstruct the new version of software by adding the new section corresponding to the data header and using the longest common substring in the old version that is identified by the pointer header.

36. A system as recited in claim 35, wherein the upgrade server constructs a table having multiple entries, in which an individual entry represents a length of a longest common substring beginning at a first position in the old character string and at a second position in the new character string, the upgrade server ascertaining the longest common substring beginning at a particular second position.

37. A system as recited in claim 35, wherein the upgrade server hashes every possible group of k contiguous bytes in the old version and every possible group of k contiguous bytes in the new version and only considers substrings that include k contiguous bytes that hash to the same value.

38. A system as recited in claim 35, wherein the pointer header includes a byte count indicating a number of bytes contained in the longest common substring.

39. A system as recited in claim 35, wherein the pointer header includes a byte count indicating a number of bytes contained in the longest common substring and an offset value identifying a corresponding first position in the old version at which the longest common substring begins.

40. A system as recited in claim 35, wherein the data header includes a byte count indicating a number of bytes of the section being added.

41. A computer-readable medium that stores computer-executable instructions for directing a computer to perform the following steps:

comparing an old character string from an old version of software with a new character string from a new version of software;

finding longest common substrings beginning at first positions in the old character string and second positions in the new character string;

for a particular second position in the new character string, ascertaining the longest common substring beginning at the particular second position;

inserting, in the upgrade file, a pointer header representing the longest common substring in lieu of inserting the longest common substring, the pointer header indicating a corresponding position in the old character string at which the longest common substring begins;

inserting, in the upgrade file, characters from the new character string that are not included in the longest common substring; and placing a data header indicating that the characters being inserted are not matched in the old character string.

42. A computer-readable medium that stores computer-executable instructions for directing a computer to perform the following steps:

hashing every possible group of k contiguous bytes in the old version to form first hash values;

hashing every possible group of k contiguous bytes in the new version to form second hash values;

in an event that one of the first hash values equals one of the second hash values, comparing an old character string from the old version that includes the k contiguous bytes forming said one first hash value with a new character string from the new version that includes the k contiguous bytes forming said one second hash value;

finding longest common substrings beginning at first positions in the old character string and second positions in the new character string; and for a particular second position in the new character string, ascertaining the longest common substring beginning at the particular second position.

* * * * *

UNITED STATES PATENT AND TRADEMARK OFFICE
CERTIFICATE OF CORRECTION

PATENT NO.     : 6,425,125 B1
DATED          : July 23, 2002
INVENTOR(S)    : Fries et al.

It is certified that error appears in the above-identified patent and that said Letters Patent is hereby corrected as shown below:

Column 4,
Line 43, delete "to" before "communication".

Column 12,
Line 7, replace "object" with -- objcnt --.

Signed and Sealed this

Fourth Day of February, 2003

JAMES E. ROGAN
*Director of the United States Patent and Trademark Office*